United States Patent [19]

McEathron

[11] 4,067,624
[45] Jan. 10, 1978

[54] EMERGENCY VALVE COVER CONTAINING A QUICK SERVICE VALVE

[75] Inventor: Eugene Douglas McEathron, Watertown, N.Y.

[73] Assignee: General Signal Corporation, Rochester, N.Y.

[21] Appl. No.: 762,608

[22] Filed: Jan. 26, 1977

Related U.S. Application Data

[63] Continuation of Ser. No. 648,844, Jan. 14, 1976, abandoned.

[51] Int. Cl.² .............................................. B60T 15/30
[52] U.S. Cl. ........................................ 303/69; 303/82
[58] Field of Search ..................................... 303/36–39, 303/68–70, 80–83

[56] References Cited

U.S. PATENT DOCUMENTS

| 3,707,314 | 12/1972 | Paginton | 303/69 X |
| 3,716,276 | 2/1973 | Wilson et al. | 303/82 |
| 3,734,575 | 5/1973 | Paginton | 303/81 X |

Primary Examiner—Duane A. Reger
Attorney, Agent, or Firm—Harold S. Wynn

[57] ABSTRACT

A fluid brake control system is provided including a brake control pipe and a control valve comprising a quick action chamber and an emergency slide valve operable from a normal to a service brake position in response to service reduction in brake pipe pressure, the emergency slide valve having a fluid pressure differential operated abutment disposed between a first pressure chamber within a housing on one side of the abutment subject to pressure of the quick action chamber, and a second pressure chamber contained in a housing cover on the other side of the abutment connected by a passage to the brake pipe. The cover includes quick action control apparatus including a quick action poppet type valve operably connected to the abutment for actuation of the quick action valve by the abutment from a normally closed to an open position in response to the operation of the abutment in one direction to a service braking position. The quick action poppet type valve vents fluid from the brake pipe when it is opened.

16 Claims, 6 Drawing Figures

EMERGENCY VALVE COVER CONTAINING A QUICK SERVICE VALVE

This is a continuation division, of Application Ser. No. 648,844, filed January 14, 1976, now abandoned.

CROSS REFERENCE TO CO-PENDING APPLICATION

This invention relates to the invention disclosed in my co-pending prior application Ser. No. 612,840, filed Sept. 12, 1975, now U.S. Pat. No. 3,966,269, granted June 29, 1976, which is herein incorporated by reference.

BACKGROUND OF THE INVENTION

This invention relates to fluid brake control systems, and while the invention is subject to a wide range of applications, a preferred embodiment of the invention will be particularly described as applied to a fluid brake control system having a control valve in which the emergency portion has an improved cover.

The present invention is an improvement over currently used quick service control devices of the well-known ABD control valve generally used for governing the brakes of freight cars. The term "quick service" as used herein relates to apparatus and systems associated with respective freight cars of a train for incrementally reducing pressure in the brake pipe locally in response to sensing that there has been a reduction in brake pipe pressure independent of the local apparatus. This provides for quicker and smoother braking by increasing the rate of propagation of a service braking signal throughout the train.

In the ABD valve, a form of quick service function is provided by the service slide valve, but to provide repeated quick service cycles as long as the brake pipe pressure continues to be reduced, the ABD valve must be supplemented by a special quick service control device such as the well-known B1 quick service valve or the special quick service valve disclosed in the U.S. Wilson et al U.S. Pat. No. 3,716,276. The type B1 quick service valve is separate from the ABD valve and requires a separate pipe bracket including a separate quick action chamber and other devices.

An object of the present invention is to provide a fluid brake control system having improved quick service control which substantially obviates one or more of the limitations and disadvantages of the described prior systems.

Another object of the present invention is to reduce the number of control devices required to provide the function of quick service controls.

Another object of the present invention is to reduce manufacturing and maintenance cost of brake application control devices.

Other objects, purposes and characteristic features of the present invention will be in part obvious from the accompanying drawings and in part pointed out as the description of the invention progresses.

SUMMARY OF THE INVENTION

A fluid brake control system is provided having a brake control pipe and a control valve of the ABD type comprising a quick action chamber and an emergency slide valve operable from a normal to a service brake position in response to a service reduction in brake pipe pressure. The emergency slide valve has a fluid differential operated abutment disposed between a first pressure chamber within a housing on one side of the abutment subject to pressure of the quick action chamber, and a second pressure chamber contained in a housing cover on the other side of the abutment connected by a passage to the brake pipe. The conventional cover for the emergency valve is modified according to the present invention to provide, in addition to the second pressure chamber, quick action control apparatus comprising a quick action poppet type valve operably connected to the abutment of the emergency slide valve for actuation of the quick action valve by the abutment from a normally closed to an open position in response to operation of the abutment in one direction from its normal position. There is a vent connection through the quick action valve means in its open position for venting fluid from the brake pipe when the emergency slide valve is in its service position. Thus by substitution of this improved cover for the conventional cover of an ABD valve, along with other minor modifications, currently used ABD valves can be modified economically to provide improved quick service control.

In the preferred embodiment of the present invention, the vent connection of the ABD valve for the quick action chamber that is normally used to vent quick action fluid during a service brake application is plugged, and another poppet type valve is added to the cover for selectively venting the quick action chamber.

A choke is provided in a passageway in the cover for limiting the flow of fluid from the brake pipe to the second pressure chamber and thus through the quick service valve to atmosphere for the purpose of causing the quick action valve to cycle as long as the brake pipe pressure is being reduced at a service rate by apparatus independent of the valves in the cover.

The poppet type valves are preferably of the double acting ball type, normally spring biased to a first closed position against a seat from which they can be opened when a service braking signal is sensed, and operated to a second closed position when an emergency braking signal is sensed.

For a better understanding of the present invention, together with other and further objects thereof, reference is had to the following description taken in connection with the accompanying drawings, while its scope will be pointed out in the appending claims.

Figure 1:
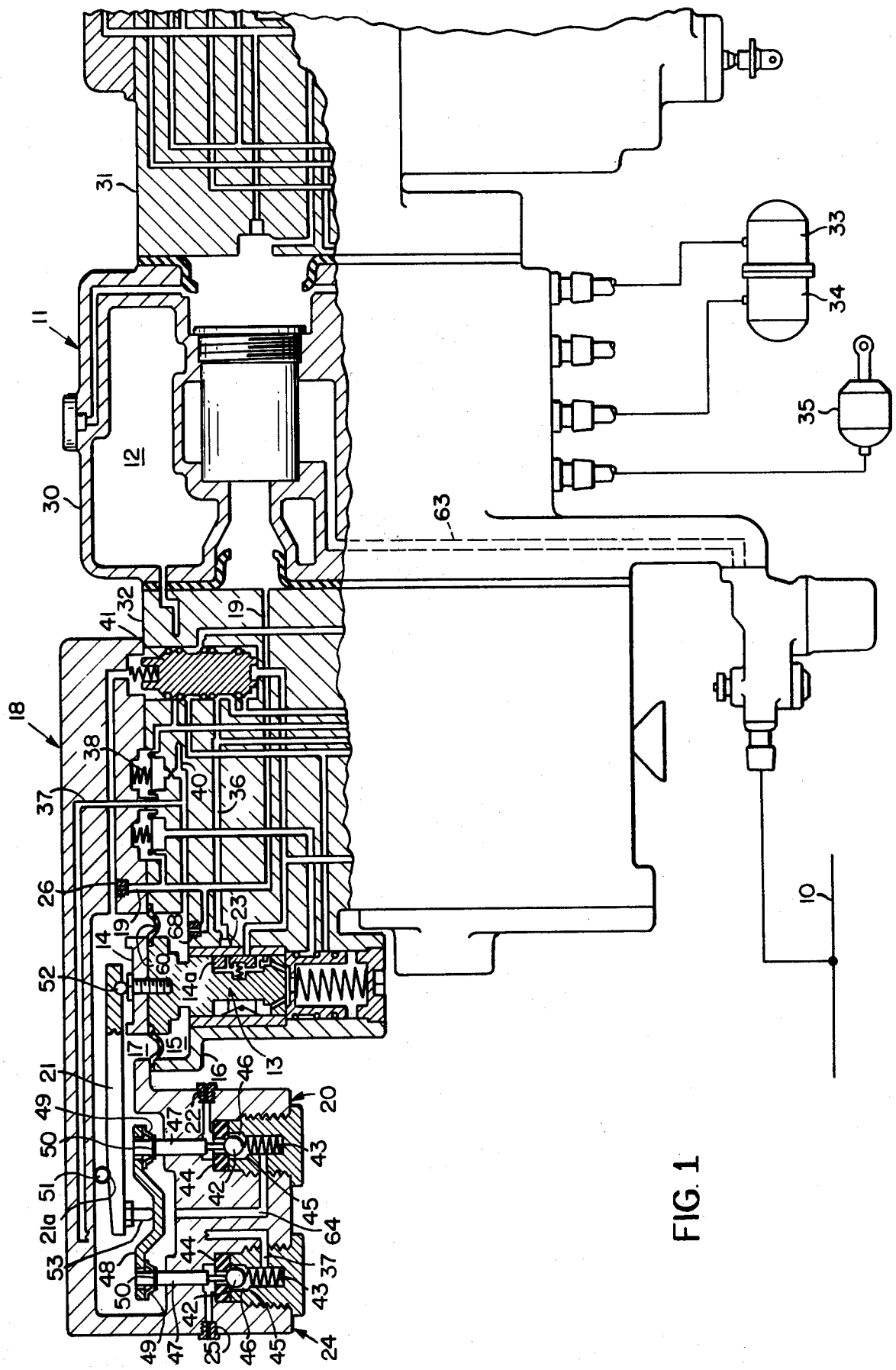
FIG. 1 illustrates schematically, partly in cross section, an ABD control valve having an improved emergency portion cover for providing additional quick service according to a preferred embodiment of the present invention.

With reference to FIG. 1, a fluid brake control system is provided having a brake control pipe 10 and an ABD control valve 11, the ABD valve comprising a quick action chamber 12 and an emergency slide valve 13 operable from a normal to a service brake position in response to a service reduction in brake pipe pressure. The emergency slide valve 13 has a fluid differential operated abutment 14 disposed between a first pressure chamber 15 within a housing 16 on the lower side of the abutment 14 subject to pressure of the quick action chamber 12, and a second pressure chamber 17 is contained in a housing cover 18 on the upper side of the abutment 14 connected by a passage 19 to the brake pipe 10. The cover 18 for the emergency valve 13 comprises, in addition to the first pressure chamber 15, a quick action control valve 20 operably connected to the abutment 14 of the emergency slide valve 13 by a lever 21 for actuation of the quick action valve 20 by the abutment 14 from a normally closed to an open position in response to operation of the abutment 14 in an upward direction from its normal position to a service braking position. There is a vent passage 22 through the quick action valve in its open position for venting fluid from the brake pipe 10 to atmosphere when the emergency slide valve 13 is in its service position.

In the preferred embodiment of the present invention, the vent passage 36 of the ABD valve for the quick action chamber that is normally used to vent quick action fluid during a service brake application is closed by a plug 23 that can be inserted upon the removal of a quick action chamber exhaust choke and another poppet type valve 24 is added to the cover 18 for selectively venting the quick action chamber through a choke 25.

A choke 26 is provided in a passageway 19 in the cover 18 for limiting the rate of flow of fluid between chamber 17 and the brake pipe. The relative sizing of the chokes 22, 25 and 26, together with the lever ratio of the operating lever 21, determines the rate of cycling of valves 20 and 24 by movement of the abutment 14 as long as pressure is being reduced in brake pipe 10 at a service rate by apparatus independent of the associated quick service valve 20.

Before considering the present invention further in detail, it is believed expedient to consider the general structure and mode of operation of a conventional ABD valve, particularly relative to response to brake pipe reduction. With reference to FIG. 1, the ABD control valve 11 comprises a pipe bracket 30 that is adapted to be secured to a car frame having a service portion 31 secured to the right-hand side of the pipe bracket 30 and an emergency portion 32 secured to the left-hand side of the pipe bracket 30. Also connected to the pipe bracket 30 is an auxiliary reservoir 33, an emergency reservoir 34, a brake cylinder 35, and the brake pipe 10. The service portion has a service valve (not shown) for governing the charging of the reservoirs 33 and 34 and the application and release of braking pressure applied to brake cylinder 35.

In considering the mode of operation of the conventional ABD valve in response to a service reduction, the service valve (not shown) is actuated from its normal positon to its service braking position upon sensing a reduction in the pressure in brake pipe 10 relative to pressure in the auxiliary reservoir 33, and in accordance therewith, its slide valve connects the auxiliary reservoir to the brake cylinder and also provides a single local quick service reduction in the pressure of brake pipe 10 as governed by a quick service limiting valve (not shown). The emergency slide valve 13, in the conventional ABD valve, senses the service reduction in brake pipe 10 relative to pressure in the quick action chamber 12 to operate its abutment 14 upwardly to an intermediate service braking position. In this position, the associated slide valve vents fluid from quick action chamber 12 at a service rate of reduction to reduce pressure in chamber 12 at a rate to correspond to service rate reduction in the brake pipe 10. This reduction is through passage 36 and the emergency slide valve portion 14a, which passage is plugged according to the preferred embodiment of the present invention by the plug 23. This reduction through the passage 36 is generally modulated to a certain extent by hunting of the abutment 14, as minor variations in relative pressures of the brake pipe 10 and the quick action chamber 12 develop quick action chamber 12 being connected to chamber 15 in the emergency portion housing 16 through a passage 40.

Figure 2:
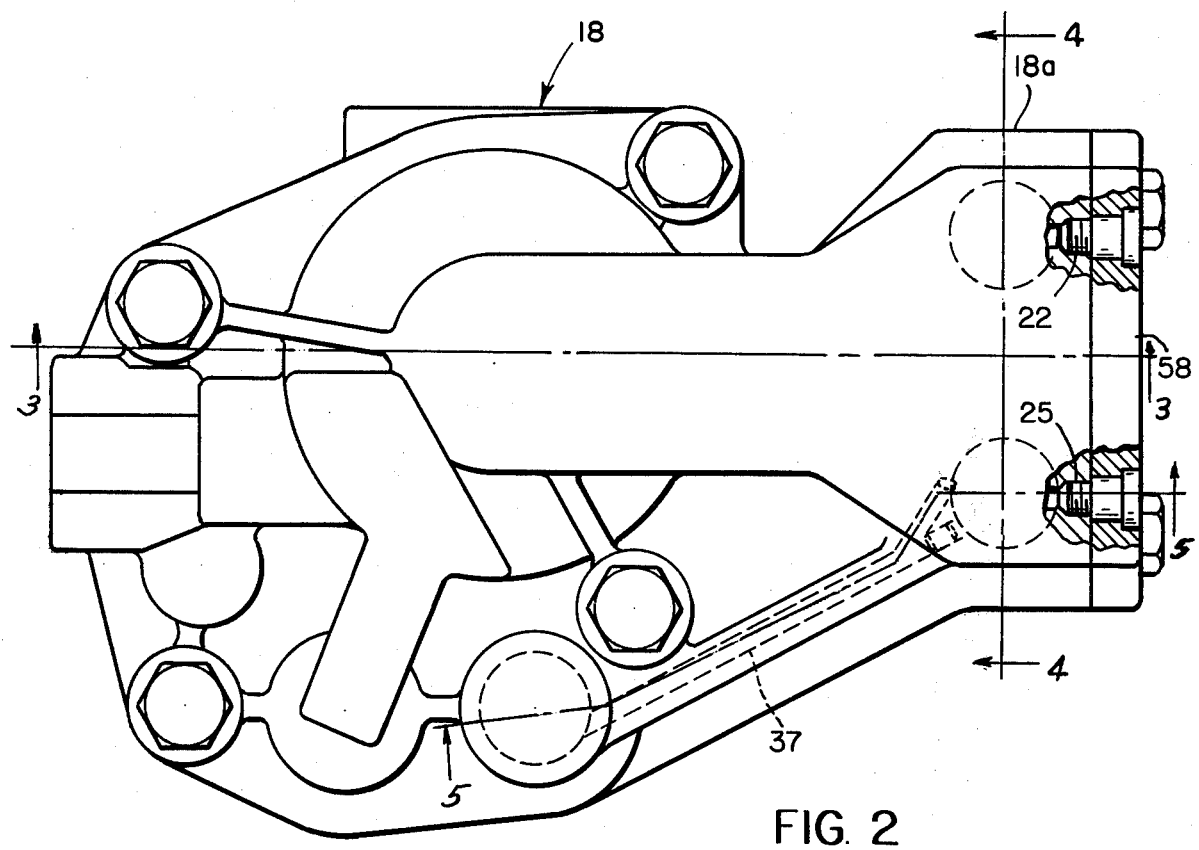
FIG. 2 is a plan view of the improved cover.

With reference to FIG. 2, the improved cover 18 has a central portion and left-hand portion formed to provide the same cavities and passageways as the conventional ABD cover which it replaces. The improved cover 18 is different, however, in that the right-hand portion containing the valves 20 and 24 has been added. The improved cover is also different than the present emergency portion cover in that it includes a passageway 37 (see FIGS. 1 and 2) for connecting quick action chamber 12 with the quick action chamber valve 24 for exhausting air from chamber 12 through choke 25 when the valve 24 is open. To provide a connection from the emergency portion 32 into passageway 37 of cover 18, the present spill-over check valve of the ABD valve is removed and is replaced by the spill-over check valve 38 of FIGS. 1 and 5. This valve has a passageway 39 formed therein for connecting passageway 37 in the improved cover 18 to the quick action chamber 12 through passage 40. The spill-over check valve 38 operates in the same manner as the corresponding valve in the present ABD control valve. The choke 26 is added in the cover in a cover passage 19 similar to a corresponding passage in the conventional ABD cover connecting brake pipe passage 19 with the chamber 17 formed in the cover above abutment 14. This choke 26 is large enough so as not to interfere with conventional operation of the emergency slide valve 14 and a high pressure valve 41 in response to an emergency braking signal in brake pipe 10.

Figure 4:
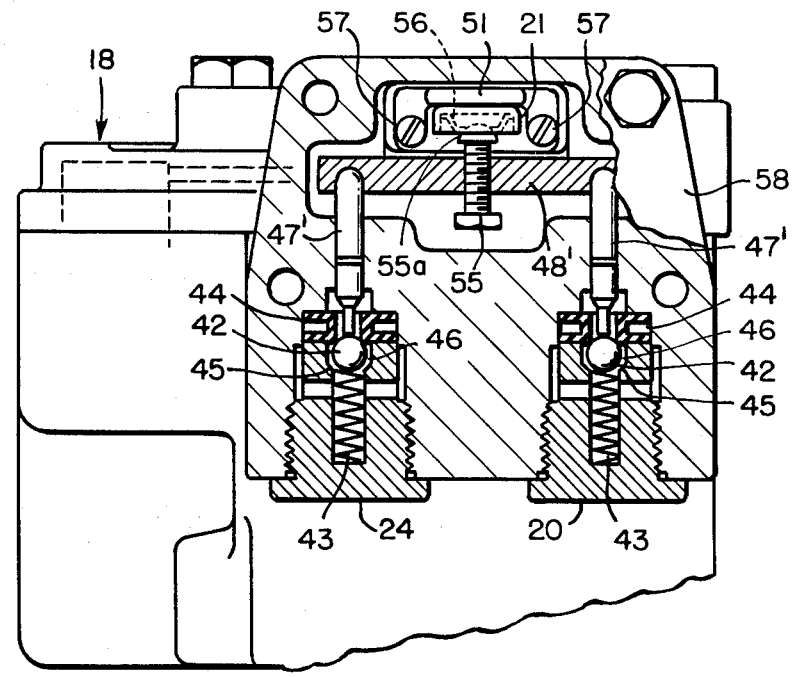
FIG. 4 is an elevational sectional end view of the improved cover taken along the section line 4—4 of FIG. 2.

With reference to FIGS. 1 and 4, each of the valves 20 and 24 is of the double acting ball poppet type, having a ball 42 operable in a bore 46 in the cover 18 between first and second closed positions. Each ball 42 is biased by a coil spring 43 to a normally closed position against a valve seat 44. The spring 43 associated with the quick action vent valve 20 is a lighter spring than the spring 43 associated with the quick action chamber vent valve 24 so that valve 20 is opened before valve 24 in response to the upward actuation of the abutment 14 when the emergency slide valve 13 is actuated to a service braking position. A taper 45 at the lower end of valve cavity 46 provides a second closure seat for the double acting valve wherein the valves 20 and 24 both become closed upon actuation of the abutment 14 of emergency slide valve 13 above its service braking position as is accomplished in response to an emergency rate reduction in the brake pipe 10. The valves 20 and 24 are laterally spaced in the cover 18, the valves 20 and 24 having push rods 47 extending upwardly from the valve balls 42 and joined at their upper ends by a bridge 48 (see FIG. 1) having openings near its ends for passage of the ends of push rods 47 under conditions where over travel is necessary as upon the actuation of abutment 14 of emergency slide valve 13 to its full emergency position. This requires more travel than actuation of the balls 42 against their seats 45, and thus finger springs 49 are provided on the push rods 47 and disposed above snap rings 50 to permit the amount of over travel required.

With reference to FIG. 1, the lever 21 operably connects the abutment 14 to the bridge 48 at an intermediate point, this lever being pivoted at an intermediate position 21a by an adjustable pivot roller 51. The lever 21 is actuated at its right-hand end by abutment 14 through a ball 52 contacting the upper end of abutment 14, and the lever 21 actuates bridge 48 through a contacting detent 53. A reduced amount of travel of push rods 47 relative to travel of the abutment 14 is effective because of the placement of the pivot point 21a as providing a substantially 1 to 4 reduction in the movement of the push rods 47 relative to movement of the abutment 14.

Figure 3:
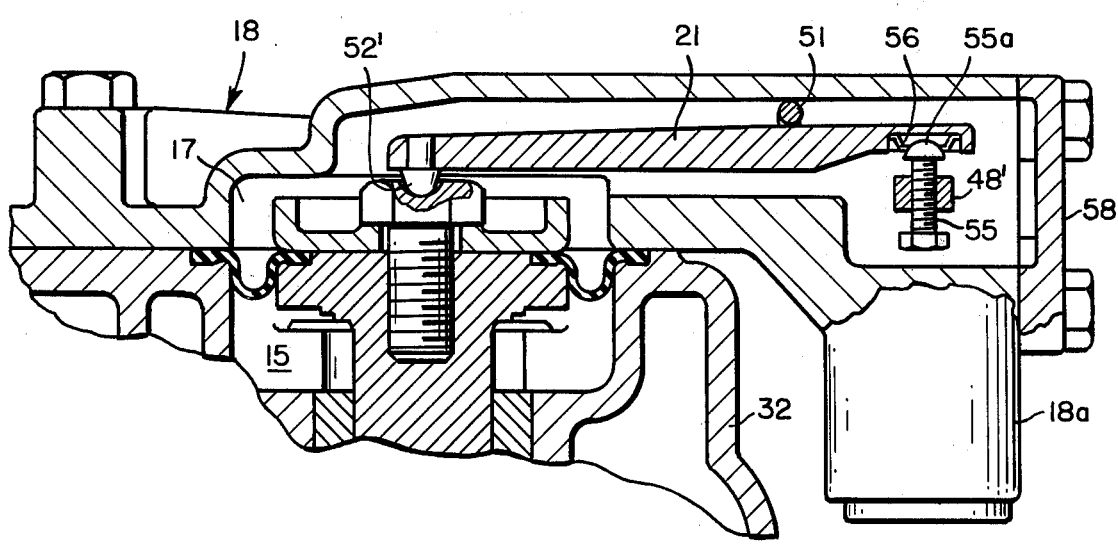
FIG. 3 is an elevational view partly in cross section of the improved cover taken along the section line 3—3 of FIG. 2.

Having thus described the structure of the braking system according to the present invention mostly with reference to the schematic illustration of FIG. 1, reference will now be made to more specific details of the structure of cover 18 as is illustrated in FIGS. 2–5. FIGS. 2 and 3 show the cover 18 as having a right-hand portion 18a overhanging one side of the emergency portion 32 of the ABD valve. This structure is required particularly because there is limited clearance above the cover 18 as the ABD valve is secured underneath a railway car. The valves 20 and 24 are disposed side by side in this overhanging portion 18a.

For the purpose of simplifying the disclosure, parts in FIGS. 2–5 that are similar to parts identified in FIG. 1 are identified by corresponding reference characters, and where there is some modification of the structure in FIGS. 2–5 as compared to the schematic showing of FIG. 1, these parts are indicated by distinctive reference characters.

Thus a modified form of the bridge 48 of FIG. 1 connecting the valves 20 and 24 is shown in FIG. 4 as a bridge 48' that has journals near its ends for upper semispherical shaped ends of push rods 47' associated with the valves 20 and 24. The bridge 48' has a stud 55 secured therein having a semi-spherical head 55a at its upper end that is operably connected to lever 21 through a finger spring 56 that permits over travel of lever 21 after the balls 42 become seated in their second closed positions against the bevelled portions 45 of the valve cavities 46. This provides an alternate means of permitting over travel of the bridge 48' as compared to the system that has already been described relative to FIG. 1.

Figure 5:
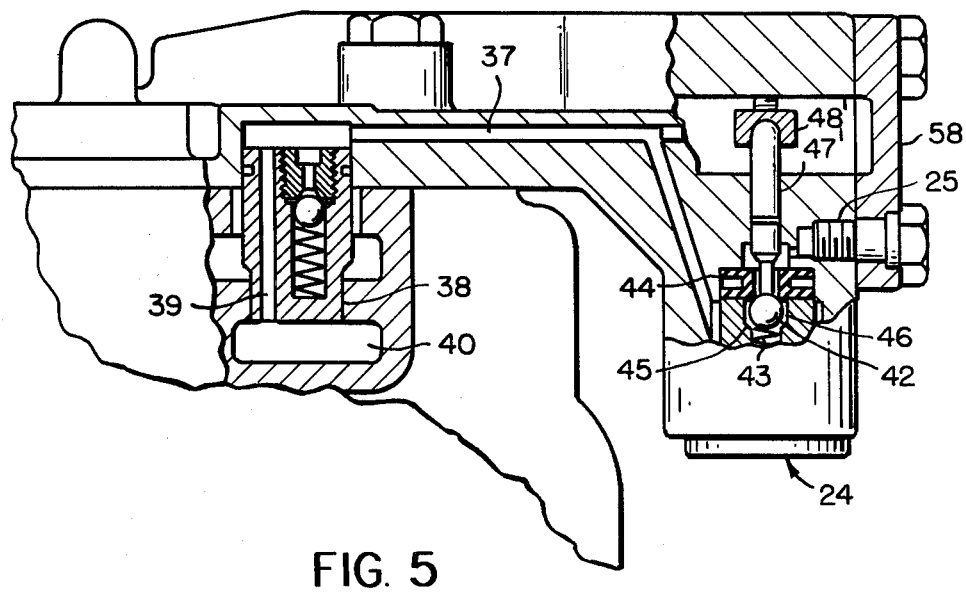
FIG. 5 is an elevational view partly in cross section of the improved cover taken along line 5—5 of FIG. 2 and an improved check valve inserted in the upper portion of the ABD valve under the cover.

With reference to FIG. 4, the roller 51 that serves as a fulcrum for the lever 21 is suitably secured to this lever by screws 57 in a position to provide an approximately one to four operating ratio of lever 21. Screws 57 are accessible by the removal of an end plate 58, which is secured to the right-hand end of the cover 18 as is shown in FIG. 5. The plate 58 carries the respective vent chokes 22 and 25 associated with vent passages extending to the respective valves 20 and 24. This cover can be modified if desired to make connections to atmosphere through wasp extruder covers (not shown).

Figure 6:
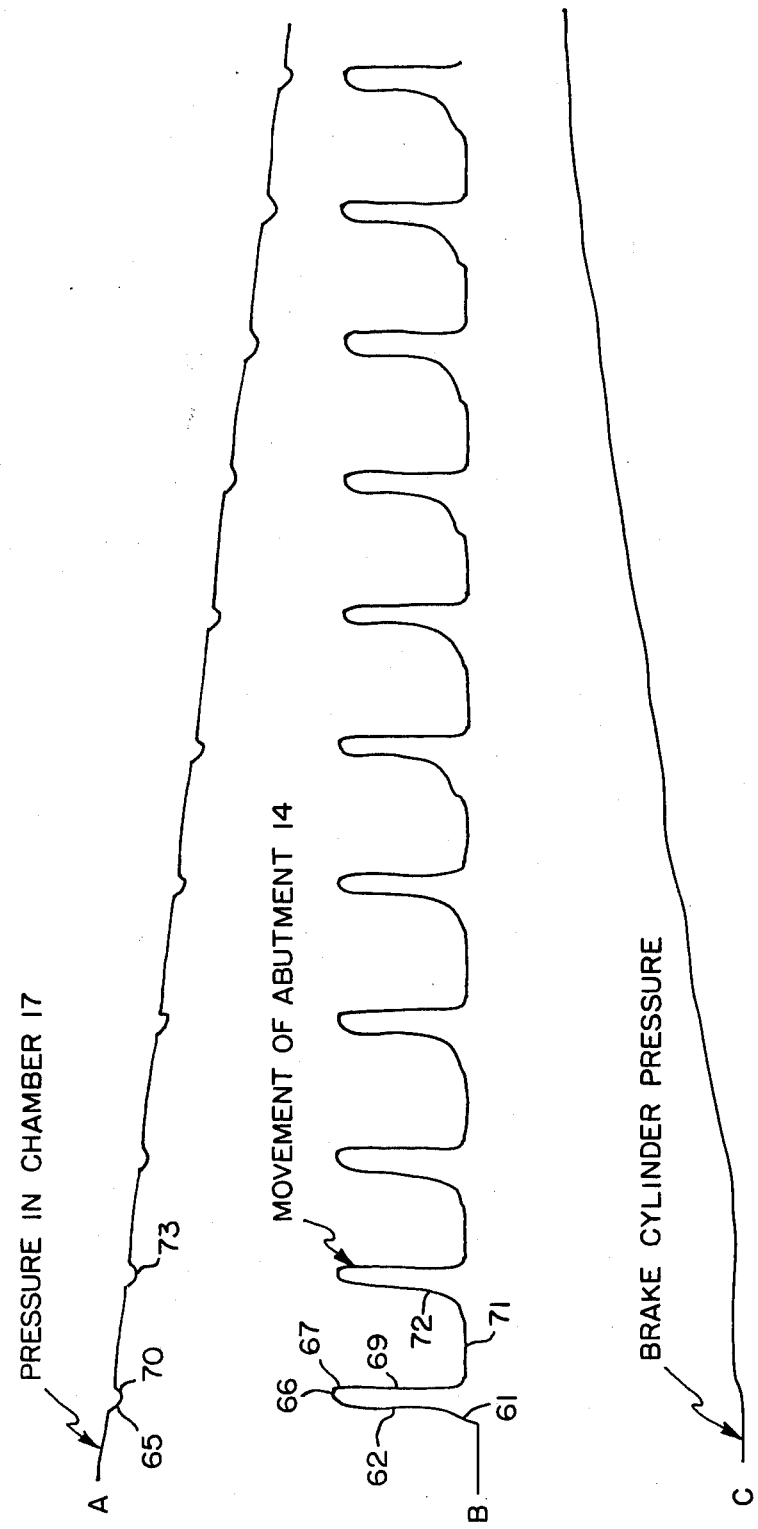
FIG. 6 is a copy of recordings of a test of an ABD valve with the improved cover for providing additional quick service control.

For consideration of the mode of operation of the valves 20 and 24 in the cover 18, reference is made to copies of test recording curves A, B and C of FIG. 6. This test was made by replacing the conventional cover on the emergency portion 32 of an ABD valve with the new cover 18, after the ABD valve had been modified by plugging passage 36 as has been described and by replacing the ABD spill-over check valve with a similar valve having a passage 39 for connecting the quick action chamber 12, through passage 37, with quick action chamber vent valve 24 in the cover 18. A service rate of reduction was applied as an input to the ABD valve and the curve A was recorded by sensing the pressure in brake pipe chamber 17 above the abutment 14 of the emergency slide valve 13. The choke 26 in the cover 18 in the passage for brake pipe fluid was therefore between the point of measurement of pressure in the test and the brake pipe 10. This choke for the test had an opening of 0.1065 inches although it is to be understood that some different choke sizes may be used. The curve B of FIG. 6 represents a test recording of cyclical movement of the abutment 14 when the associated ABD valve is subject to brake pipe reduction at a service rate. The curve C represents the rate of build-up of the brake cylinder pressure in response to the ABD valve sensing the service brake reduction signal.

With reference to FIG. 6, upon initially sensing reduction in the brake pipe 10, the abutment 14 starts to move upwardly as indicated at point 61 of curve B, but because of the resiliency of the valve seats 44 and the 1 to 4 reduction ratio in lever 21, the abutment 14 moves some distance before the quick action valve 20 starts to open. When valve 20 is opened, fluid is exhausted to atmosphere through choke 22 from the brake pipe chamber 17 through passage 46 and valve 20 in its open position. The exhausting of fluid from chamber 17 increases the pressure differential across diaphragm 60 still more causing abutment 14 to move upwardly as represented by portion 62 of curve B. Up until this time, the quick action chamber valve 24 remains closed because of its biasing spring 43 being heavier than the corresponding biasing spring 43 of valve 20. Thus the bridge 48 pivots at its intermediate point and opens valve 20 before opening valve 24.

The initial opening of valve 20 causes a dip in curve A at point 65, because of local reduction in pressure in chamber 17 above the diaphragm 60 of the emergency slide valve 13. This reduction in pressure causes the abutment 14 to move still higher to a point recorded at 66 in curve B. The extended movement of the abutment 14 upwardly, however, opens the quick action chamber exhaust valve 24 and causes fluid to be exhausted to atmosphere through quick action chamber choke 25. Under these conditions, fluid is exhausted from quick action chamber 12 through passages 40 and 37, cavity 46 of valve 24 and through choke 25 to atmosphere. This reduces the pressure in chamber 15 below diaphragm 60 and causes the abutment 14 to start to move downwardly as is recorded at point 67 on curve B. Because of the relatively larger volume of the fluid storage in various portions of the brake pipe as compared to the fluid volume of the quick action chamber and its associated passages, and because choke 25 is larger than choke 22, pressure in the chamber 15 below the diaphragm 60 becomes reduced more rapidly than pressure reduction in chamber 17 during the final upward movement of abutment 14 with both valves 20 and 24 open, resulting in the downward movement of abutment 14.

Chambers 17 and 15 respectively above and below the diaphragm 60 are both replenished by fluid from the brake pipe 10, but at different rates. Fluid is supplied from brake pipe 10 to chamber 17 (a relatively small volume) above the diaphragm 60 as has been described through a relatively large choke 26 (0.1065 of an inch in diameter), while fluid is supplied from brake pipe 10 to chamber 15. (combined with chamber 12 for a larger effective volume) through a much smaller choke 68 (0.020 of an inch in diameter). Thus pressure in chamber 17 above diaphragm 60 increases much more rapidly than in chamber 15 below the diaphragm 60 to drive the abutment 14 downwardly as is indicated by the portion 69 of curve B in FIG. 6. The downward movement of abutment 14 closes both valves 20 and 24, thus restricting the venting of fluid and further accelerating movement downwardly of the abutment 14. Pressure builds up in chamber 17 as is indicated at the point 70 of curve A.

Valves 24 and 20 thus become closed as the abutment 14 moves downwardly, subsequent to which the abutment 14 is maintained in a point of equilibrium at 71 until further reduction in the brake pipe pressure causes reduction in brake pipe chamber 17 as compared to quick action pressure in chamber 15 so as to raise the abutment 14 as indicated at point 72 of curve B for initiating a second cycle of operation to be effective in the same manner as has been described in detail for the first cycle. This second cycle of operation provides for a second local reduction of pressure in chamber 17 as illustrated at point 73 of the curve A.

As long as pressure in the brake pipe 10 continues to be reduced independent of the operation of the quick service valve 20, the quick service valve 20 continues to cycle as illustrated by the curve A, even if the brake pipe pressure is reduced below the normal service pressure of 50 pounds. According to FIG. 6, there is an average of one cycle of operation for every 1.5 seconds during the time when brake pipe pressure is reduced from 70 pounds to 50 pounds. During this time, brake cylinder pressure increases according to the general mode of operation in an ABD valve as is illustrated by the curve C until equalization pressure is reached with pressure in the auxiliary reservoir 33.

Although satisfactory operation can be obtained by using different combinations of choke sizes, it has been found that satisfactory operation can be obtained as shown by the curves of FIG. 6 by using a brake pipe exhaust choke 22 that is 0.0465 of an inch in diameter, a quick action chamber exhaust choke 25 that is 0.086 of an inch in diameter, and a brake pipe passage choke 26 that is 0.1065 of an inch in diameter. This is used with a 1 to 4 reduction in lever 21 providing an approximate distance of travel of valves 20 and 24 of 0.012 of an inch during a cycle while the abutment 15 travels approximately 0.048 inches. In other tests it has been found that satisfactory results are obtained using a 0.055 inch diameter brake pipe exhaust choke 22, a 0.116 inch diameter quick action exhaust choke 25 and a 0.1065 brake pipe passage choke 26.

Having thus described a fluid brake control system for a vehicle having an improved quick service valve added to an emergency portion cover as a preferred embodiment of the present invention, it is to be understood that various modifications and alterations may be made to the specific embodiment shown without departing from the spirit or scope of the invention.

What is claimed is:

1. A fluid brake control system having a brake pipe, a control valve of the ABD type including a quick action chamber in a pipe bracket and an emergency portion housing secured to the pipe bracket, the housing containing an emergency slide valve means selectively operable axially for governing venting of the quick action chamber, the slide valve means being operable axially from a normal position to fully actuated and intermediate positions in accordance with the sensing respectively of emergency and service rates of pressure reduction in the brake pipe and the slide valve means having a fluid differential operated abutment disposed between a first pressure chamber within the emergency portion housing on one side of the abutment subject to pressure of the quick action chamber and a second pressure chamber contained in an emergency portion cover on the other side of the abutment connected by a passage to the brake pipe wherein an improved emergency portion cover on the other side of the abutment has secured thereto quick action control means for at least periodically venting fluid from the brake pipe as long as the brake pipe is vented at a service rate comprising;

a. normally closed quick action poppet type valve means operably connected to the abutment and opened when the emergency slide valve means is in the intermediate position in response to the service rate of reduction in the brake pipe, and b. venting means permitting passage of fluid from the brake pipe through the quick action valve means in series with an exhaust choke for venting fluid from the brake pipe at a controlled rate in response to actuation of the emergency slide valve means to its intermediate position upon sensing a service rate of reduction in the brake pipe.

2. A fluid brake control system according to claim 1 wherein another valve means is operably connected to the abutment for actuation of said another valve means by the abutment from a normally closed to an open position in response to operation of the emergency slide valve means to its service brake position, and venting means is provided including said another valve means in its open position and a quick action exhaust choke for venting fluid from the quick action chamber.

3. A fluid brake control system according to claim 2 wherein means is provided for opening said another valve means for venting fluid from the quick action chamber subsequent to the quick action poppet type opening of the valve means for venting fluid from the brake pipe.

4. A fluid brake control system according to claim 3 wherein said another valve means is of the poppet type and is contained in the improved cover.

5. A fluid brake control system according to claim 4 wherein the passage connecting the brake pipe and the second pressure chamber includes a brake pipe chamber choke.

6. A fluid brake control system according to claim 5 wherein the chokes are relatively sized to cause oscillation of the abutment in accordance with continuous reduction of brake pipe pressure.

7. A fluid brake control system according to claim 6 wherein the brake pipe exhaust choke is more restrictive than the quick action chamber exhaust choke.

8. A fluid brake control system according to claim 7 wherein the brake pipe exhaust choke and the quick action chamber exhaust choke are both more restrictive than the brake pipe chamber choke.

9. A fluid brake control system according to claim 4 wherein said quick action valve means and said another valve means are double acting so as to be closed when the emergency slide valve is operated to release and emergency position respectively.

10. A fluid brake control system according to claim 4 wherein the poppet type valve means is operably connected to the abutment by operating means having a lever pivoted at an intermediate point to provide a travel ratio reduction of movement of the poppet type valve means as compared to movement of the abutment.

11. A fluid brake control system according to claim 10 wherein the travel ratio of the poppet type valve means relative to the abutment is approximately 1 to 4.

12. A fluid brake control system according to claim 10 wherein means is provided for adjustment of the pivot point to permit changing of the travel ratio.

13. A fluid brake control system according to claim 10 wherein the quick action valve means and said another valve means are laterally spaced relative to each other at one side of the cover and the operating means comprises push rods for operating the respective valve means and a bridge connecting the push rods, the push rods being subject to actuation by the lever contacting the bridge at an intermediate point between said quick action valve means and said another valve means, whereby the quick action valve means is permitted to be opened prior to the opening of said another valve means.

14. A fluid brake control system according to claim 10 wherein lost motion means is provided to permit over travel beyond closed positions of the double acting valve means when the emergency slide valve is actuated to its emergency position.

15. A fluid brake control system according to claim 14 wherein the lost motion means comprises a resilient connection of said quick action valve means and said another valve means to the lever.

16. A fluid brake control system according to claim 4 wherein the quick action valve means and said another valve means are both of the ball poppet valve type wherein a ball is normally biased against a seat of resilient material by a coil spring, the bias of the quick action valve means being lighter than the bias of said another valve means, whereby said quick action valve means is opened first when the emergency slide valve means is actuated from its normal position to its service brake position.

* * * * *